United States Patent [19]

Stumer

[11] Patent Number: 5,892,819
[45] Date of Patent: *Apr. 6, 1999

[54] CALL FORWARD MANAGED REROUTING

[75] Inventor: Peggy Marie Stumer, Boca Raton, Fla.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 606,260

[22] Filed: Feb. 23, 1996

[51] Int. Cl.$^6$ .............................. H04M 3/54; H04M 7/00; H04J 3/12

[52] U.S. Cl. .......................... 379/211; 370/259; 370/385; 370/524; 379/220; 379/224; 379/230

[58] Field of Search ...................................... 370/259, 264, 370/270, 384, 385, 522, 524; 379/201, 207, 210, 211, 214, 219, 220, 221, 224, 230

[56] References Cited

U.S. PATENT DOCUMENTS

| | | | |
|---|---|---|---|
| 4,723,273 | 2/1988 | Diesel et al. | 379/211 |
| 4,893,336 | 1/1990 | Wuthnow | 379/211 |
| 5,018,194 | 5/1991 | Suzuki et al. | 379/207 |
| 5,023,868 | 6/1991 | Davidson et al. | 370/524 X |
| 5,416,834 | 5/1995 | Bales et al. | 379/207 X |
| 5,452,349 | 9/1995 | Uehara et al. | 379/211 |
| 5,649,004 | 7/1997 | Ikeno et al. | 379/211 X |
| 5,675,638 | 10/1997 | Ogasawara et al. | 379/220 |
| 5,790,638 | 8/1998 | Bertacchi | 379/88.26 |

FOREIGN PATENT DOCUMENTS

| | | | |
|---|---|---|---|
| 0 510 861 A2 | 10/1992 | European Pat. Off. | H04Q 3/66 |
| 0 550180 A2 | 7/1993 | European Pat. Off. | H04Q 3/00 |
| 0556 515 A2 | 8/1993 | European Pat. Off. | H04Q 3/00 |

OTHER PUBLICATIONS

J. Van Gelder, et al., "Private Networking with SOPHO–TBX and SOPHO S Systems," Dec. 1985, Philips Telecommunications Review, 43, No.4, pp. 237–252, Hilversum, Netherlands.

*Primary Examiner*—Harry S. Hong

[57] ABSTRACT

A method and system of managing call forwarding includes establishing criteria for selecting among possible links between nodes for forwarding calls from an originating node to a destination node. In the preferred embodiment, the selection of the possible links is made at a called node from which the call is to be forwarded. Based upon the administrable criteria, there is a determination as to whether an intermediate node along the call path between the originating node and the called node is to be selected for initiating the forwarding path. If an intermediate node is selected, a request is transmitted to the intermediate node to initiate the forwarding path to the destination node. On the other hand, if no intermediate node is selected, a determination is made as to whether to initiate the forwarding path from the originating node or from the called node. Again, the determination is made according to the administrable criteria. Typically, the most important factor in selecting among the nodes relates to minimizing the link necessary to connect the calling party to the forwarded-to party, thereby releasing links for other use within a network.

20 Claims, 10 Drawing Sheets

| CASE # | EVENT |
|---|---|
| CASE 1 | THROWBACK, EXIT PROCEDURE |
| CASE 2 | FORWARD SWITCH |
| CASE 3 | THROWBACK, EXIT PROCEDURE |
| CASE 4 | FORWARD SWITCH |
| CASE 5 | THROWBACK, EXIT PROCEDURE |

70

| INC. TRUNK GROUP | NODE ID/ DIGIT STRING | LOGICAL BOUNDARY NUMBER | HOME NODE INDICATION | TRANSIT/ GATEWAY NODE ID |
|---|---|---|---|---|
| 99 | 501 | 1 | - | - |
| 67 | 505 | 1 | - | - |
| 98 | 600 | 2 | - | - |
| 54 | 605 | 2 | - | 401 |
| 66 | 704 | 3 | HOME | - |
| 53 | 777 | 3 | - | - |
| 67 | 850 | 4 | - | - |
| 77 | 4989722 | 0 | - | 777 |

CALL FORWARD MANAGED REROUTING

TECHNICAL FIELD

The invention relates generally to methods and systems for managing call forwarding and more particularly to methods and systems for selecting among a number of possible nodes for initiating a forwarding path for a call.

BACKGROUND ART

Systems that allow a call to be forwarded from a called node of a network to another node are well known. If a user who receives service via a first node enables call forwarding to a user site that is serviced by means of a second node, a call to the first node will be diverted to the second node. Thus, there is a call path from the originating node to the first node and a forwarding path from the first node to the second node in order to place a calling user in contact with the called user.

While the call forwarding capability provides a number of conveniences, the prior art approach is susceptible to adding significantly to the costs of certain types of call connections. For example, a call may be originated from a node within the United States, while the called node may be in Germany. This call path will typically require the use of relatively expensive international integrated services digital network (ISDN) facilities, either switched or leased. If the destination node to which the call is to be diverted is also within the United States, an international trunk will again be required for the forwarding path from the called node to the destination node. The double use of the international trunk will significantly increase the cost of the connection call from the originating user to the destination user.

U.S. Pat. No. 5,452,349 to Uehara et al. describes an improvement for use in a communication system that includes a public network connected to an ISDN. A call deflection control system is included within the public network. If call forwarding is enabled at a terminal of the public network, a judgment will take place upon receiving a call from a terminal of the ISDN. The control system judges whether the call is to be forwarded to a terminal of the called public network or to a terminal of the originating ISDN. If the call is to remain within the public network, the forwarding is executed at the terminal of the public network. On the other hand, if the call is to be forwarded to a second terminal of the ISDN, a request is made to the ISDN to execute call forwarding.

This eliminates the problems associated with using two different ISDN lines.

The system of Uehara et al. has advantages over prior art call forwarding control systems. However, application of the system is limited. For example, the destination of the forwarded call may be in a third network, so that the Uehara et al. system is not applicable.

What is needed is a method and system for managing calls to be forwarded such that facilities and resources are conserved.

SUMMARY OF THE INVENTION

A method and system of managing the forwarding of calls includes determining which of an originating node, a called node or an intermediate node is the optimal node for initiating a link to a location to which the call is to be forwarded, i.e., the destination node. The determination of the appropriate node for initiating a forwarding path to the destination node is based upon administrable predefined criteria which allow a party to customize the call forwarding operation to meet specific network requirements of the party. In the preferred embodiment, the criteria include the originating user's permission to be forwarded, the location and the connectability of the destination node relative to each of the originating node, the called node, and any tandem/gateway nodes that may be intermediate along the call path from the originating node to the called node.

The first step in the method of managing call forwarding is to establish criteria for selecting among alternative forwarding paths for reaching the destination node to which the call is allowed to be forwarded when the forwarded-to user is remote from the forwarding user. Typically, the established criteria have a goal of minimizing links that are used to establish the connection. This provides a savings in terms of costly trunk facilities and lowers the traffic load, particularly when a network includes international links. However, other factors are relevant. For example, a node may not have the capability of initiating a forwarding path, so that there must be a provision for determining forwarding capability. Another possible factor in the selection of a node for initiating a forwarding path relates to traffic along a particular link at the time of forwarding a call. If a link of a potential forwarding path is detected to be particularly busy, that link may be disregarded in the selection of a path.

In the preferred embodiment, the next step is to determine whether an intermediate node along the call path from the originating node to the called node is to be selected for initiating the forwarding path to the destination node. Conventionally, nodes are grouped according to certain attributes, such as geographical proximity, network protocol type, and routing and rerouting attributes. A "node group" is also referred to herein as a "logical boundary." Links between some node groups may be simple private network links, while connections between node groups having incompatible attributes may require one or more gateway nodes and an expensive gateway link in order to allow communication between the nodes of the different groups. The gateway node from one network to another network is typically also a major hub within the network in which the gateway node resides. The links between nodes or node groups may be public switched ISDN links or private ISDN links. The end-user or end-nodes may be non-ISDN links. An intermediate node that performs the call forwarding rerouting acts on behalf of the end-user.

If in the implementation of the method it is determined that an intermediate node is to initiate the forwarding path, a request is transmitted in the backward direction from the called node. This request specifies the identification of the intermediate node which is to establish the call forwarding. In the preferred embodiment, the intermediate node is along the call path from the originating node to the called node, so that the intermediate node is in a position to save information within the setup message as it is originally transmitted from the originating node to the called node. For example, the identification of the originating node is saved and the identification of the forwarding node is added to the setup information when the intermediate node is requested to perform the redirection. While not critical, the saving/appending of information by the intermediate node may require that the call forwarding capability be set "active" at the intermediate node.

Upon determining that an intermediate node is to be used to initiate the call forwarding path, the request is transmitted from the called node to the intermediate node. The link between the called node and the intermediate node is then disconnected, freeing this link for other calls.

If there is no intermediate node or if no intermediate node is selected for initiating the forwarding path, the established criteria are utilized to select between initiating the forwarding path from the originating node or from the called node. In most instances, if the destination node is in the same group as the called node, the call is diverted from the called node, using techniques well known in the art. If the destination node is within the same group as the originating node, the originating node is typically the selected node for initiating the forwarding path. However, the established criteria may dictate a different arrangement, such as for instances in which the originating node does not support call forwarding service.

If the originating node is to be used to initiate the forwarding path to the destination node, the call path to the called node can then be disconnected. Again, there is a savings of processing and link resources. Managed call forwarding translates into potential savings in cost and significant increases in link availability.

BRIEF DESCRIPTION OF THE DRAWINGS

FIG. 3 is an exemplary control table formed in one of the steps of FIG. 2.

BEST MODE FOR CARRYING OUT THE INVENTION

Figure 1:
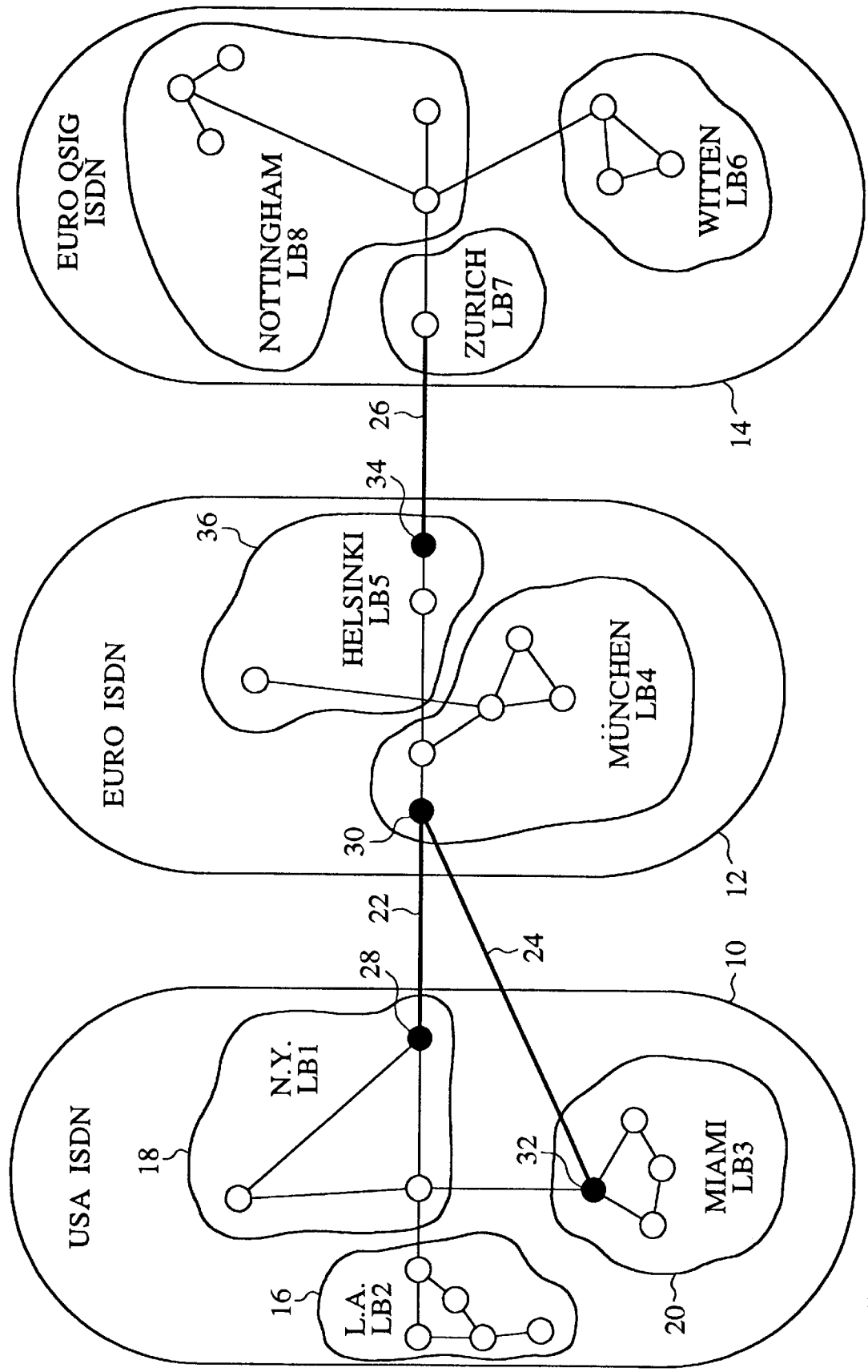
FIG. 1 is a schematic representation of an exemplary topology in accordance with the prior art.

With reference to FIG. 1, an example of a network topology is shown as including three interconnected networks 10, 12 and 14. Each network includes more than one group of nodes. Each group is referred to herein as a "logical boundary" (LB). Logical boundaries may be based upon routing attributes and/or on geographical location. Each network includes a number of logical boundaries. The assignment of a logical boundary to a particular network is based upon geographical location and the network protocol type.

Within the first network 10 are three logical boundaries 16, 18 and 20. Communication between two nodes within the same logical boundary or between two nodes of different logical boundaries, but within the same network, may take place by private network links. The private network links are represented by the thinner node-connection lines in FIG. 1. On the other hand, connections between nodes of different networks 10, 12 and 14 may take place by means of gateway links 22, 24 and 26, as represented by the thicker node-connection lines. Each gateway link is connected to at least one gateway node 28, 30, 32 and 34. The gateway nodes are more powerful nodes that support the gateway links, which are typically expensive international ISDN facilities, either switched or leased. Often, each gateway node is also a major hub within the network in which the node resides.

Following most prior art techniques, the call forwarding procedure is one in which a call path is formed from an originating node to a called node and then a forwarding path is formed from the called node to the designated destination node. This is known as "forward switching" at the called/redirecting node. For example, if a user who is served by one of the Los Angeles nodes of logical boundary 16 calls a user who is served by gateway node 34 in the Helsinki logical boundary 36, the call path will be from the node of LB2 to the node of LB5. If the called user has designated a node in the New York logical boundary 18 for purposes of call forwarding, the forwarding path will be from LB5 to the designated node of LB1. This connection of the calling party to the forwarding party requires two uses of an expensive international trunk of the gateway link 22.

In contrast to prior art techniques, the invention manages call forwarding by selecting among a number of possible nodes for initiating a forwarding path to the designated destination node. In the preferred embodiment, the first step is a selection process based on a "control" table which is used to determine whether an intermediate node along the call path from LB2 to LB5 is to be selected as the node from which a forwarding path is to be initiated. As will be explained in greater detail below, if gateway node 28 is selected, the called node of LB5 will then transmit a forwarding request to the gateway node 28. When the forwarding path is formed, the link between the node of LB5 and the gateway node can be released.

Still referring to the preferred embodiment, if an intermediate node along the call path is not selected, there is a determination as to whether the called node or the originating node should initiate the forwarding path, based again upon the "control" table. For the example in which the originating node is in the same network 10 as the destination node, the originating node is more likely to be selected. However, the criteria for selecting among nodes must include the determination of whether a particular node supports call forwarding. If the originating node of LB2 does not include call forwarding capability, the called node will be selected to initiate the forwarding path. If an originating node is selected, a forwarding request is transmitted to the originating node and the link between the originating node and the called node can be released.

The call forward managed rerouting system may be a supplementary service for private telecommunication networks/exchanges (PTN/Xs), where rerouting may be via private links or a virtual private network using switched public network links. Upon encountering a called user who is forwarding to a remote location, the system ideally provides the most economic rerouting path, as predefined by administration. The rerouting may be performed by the originating node, the called node, or a specified intermediate node.

Call forward managed rerouting (CFMR) includes at least two services, CFMR at the served user switch (CFMR_S) and CFMR at the rerouting switch (CFMR_R).

Figures 2, 5:
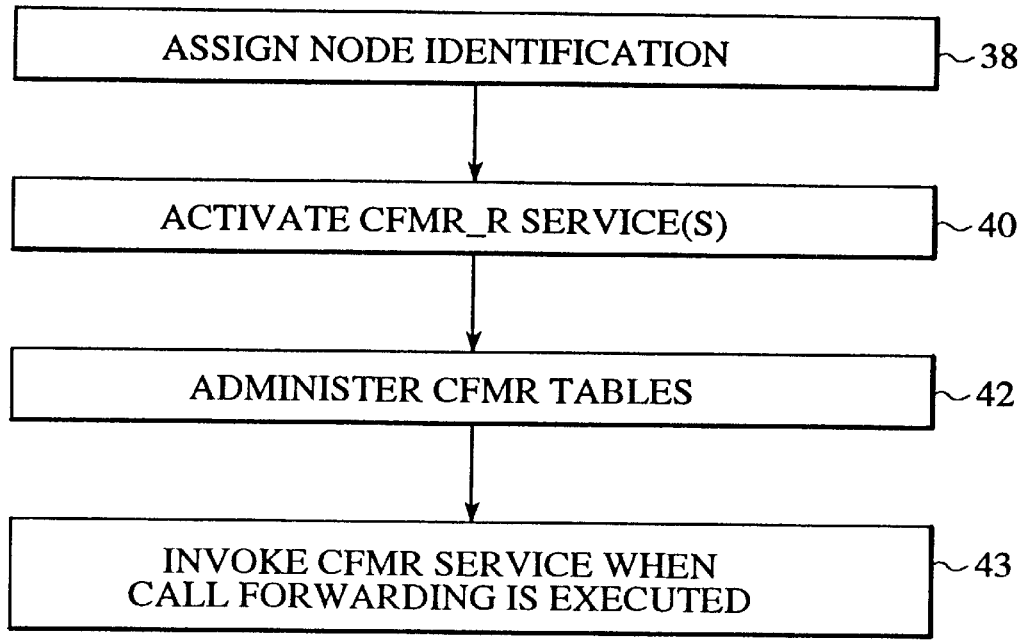
FIG. 2 is a flow chart of steps for establishing conditions for call forwarding in accordance with the invention.
FIG. 5 is a table of alternative events to be implemented upon encountering step 68 of FIG. 4.

Referring now to FIG. 2, each node (PTN/X) in the networks 10, 12 and 14 of the type shown in FIG. 1 is assigned a unique node identification. The assignment is shown as step 38. Each node is aware of its assigned network-wide unique node ID, so that the node ID may be transmitted with the conventional setup information whenever a call is placed. The node ID may be embedded within the numbering plan.

Step 40 is the function of administering intermediate nodes to activate CFMR_R service in order to store the necessary information and monitor the D-channel in the backward direction for a call forwarding request. Additional detail regarding the CFMR_R service will be set forth immediately below, when referring to step 43.

Two local tables are administered in step 42 in order to provide information for selecting among possible nodes for initiating a forwarding path. A "case event" table (FIG. 5) is the action that is to be taken depending upon the result from the Rerouting at Forwarding or Originating Node Determination Algorithm. A "control" table (FIG. 3) is used to store selection data.

In step 43, services are invoked. CFMR_S is invoked at the node of the subscriber that activates call forwarding to a remote site. The service is invoked automatically at the called node when an incoming call reaches the called site. CFMR_R is provided at the rerouting switch where the intermediate node (i.e., tandem/gateway node) CFMR is active on a per-trunk-group basis. A trunk group may be administered for CFMR_R_active or may be administered for CFMR_R_inactive. This service will be automatically invoked at an intermediate node depending upon how the relevant trunk group has been administered. If the trunk group is administered as inactive, the intermediate node will not save the necessary data for subsequent rerouting or monitor the D-channel at that intermediate node, so that any forwarding request messages will be passed through the node for action by a preceding node in the call path.

FIG. 3 is an illustration of an implementation of a CFMR control table 44. A first column 46 identifies an optional incoming trunk group assignment. For flexibility and alternate routes, more than one trunk group can be specified for a node ID/digit string. In a second column 48, the node IDs are identified. Each node ID in the network must have a table entry and its logical boundary number. Digit strings may also be entered (e.g., full or partial public number). It is recommended that the numbering plan region or location code be used as the node ID of a node, since it may be necessary to correlate the calling party number, the forwarding number and the forwarded-to number to the node ID. For example, in the United States, the node ID may be the area code plus an office code that is based on the DID number for the particular subscriber, e.g. 407997. However, other techniques may be used in establishing node IDs.

A third column 50 of the control table 44 identifies the logical boundary number. As previously noted, nodes within the same geographical area and/or within the same network are grouped into logical boundaries.

A home node indication column 52 identifies the node at which the control table 44 is stored. As an alternative to providing the column 52, the identification of the home node can be derived from some other location within the local database.

A transit/gateway node ID column 54 is a field that specifies the forwarding node for calls that are to be rerouted from a particular intermediate node, such as a gateway node or transit (i.e. "tandem") node. The specified intermediate node must be within the call path. That is, the identified node must be one of the nodes used in the setup connection from the originating node to the called node.

The control table 44 of FIG. 3 can be used to store public network digit string patterns as the node ID when the client network requires incoming calls with a specified digit pattern match to be rerouted at a particular intermediate node. The control table need not take the configuration shown in FIG. 3, since other implementations may be used with acceptable results. The residency of the information is preferably at the called node. Thus, CFMR_S would be resident at every node which has subscribers. However, the implementation may be at a gateway, rather than at each node, i.e., PTN/X. Storing the information at the gateway reduces the complexity of administration, but jeopardizes the selection of an optimal forwarding path to the destination node.

As an implementation option, a second CFMR control table can be administered to replace the first during specified times of each day or during specified days of the week. For example, the second control table may be utilized during non-peak periods.

The step 42 of administering the CFMR control table is at least a portion in the operation of establishing criteria for selecting among various nodes for initiating a forwarding path. Typically, the established criteria have a goal of minimizing links for connecting the calling party to the forwarded-to party. This provides a savings in terms of trunk facilities and lowers the traffic load. Other factors may or must also be considered in establishing the criteria. For example, a particular node may not support call forwarding, so that the node must be eliminated from the selection of nodes. Another factor is traffic along a link. If a link is particularly busy, it may be preferred to select a lengthier, but less busy, forwarding path.

Figure 4:
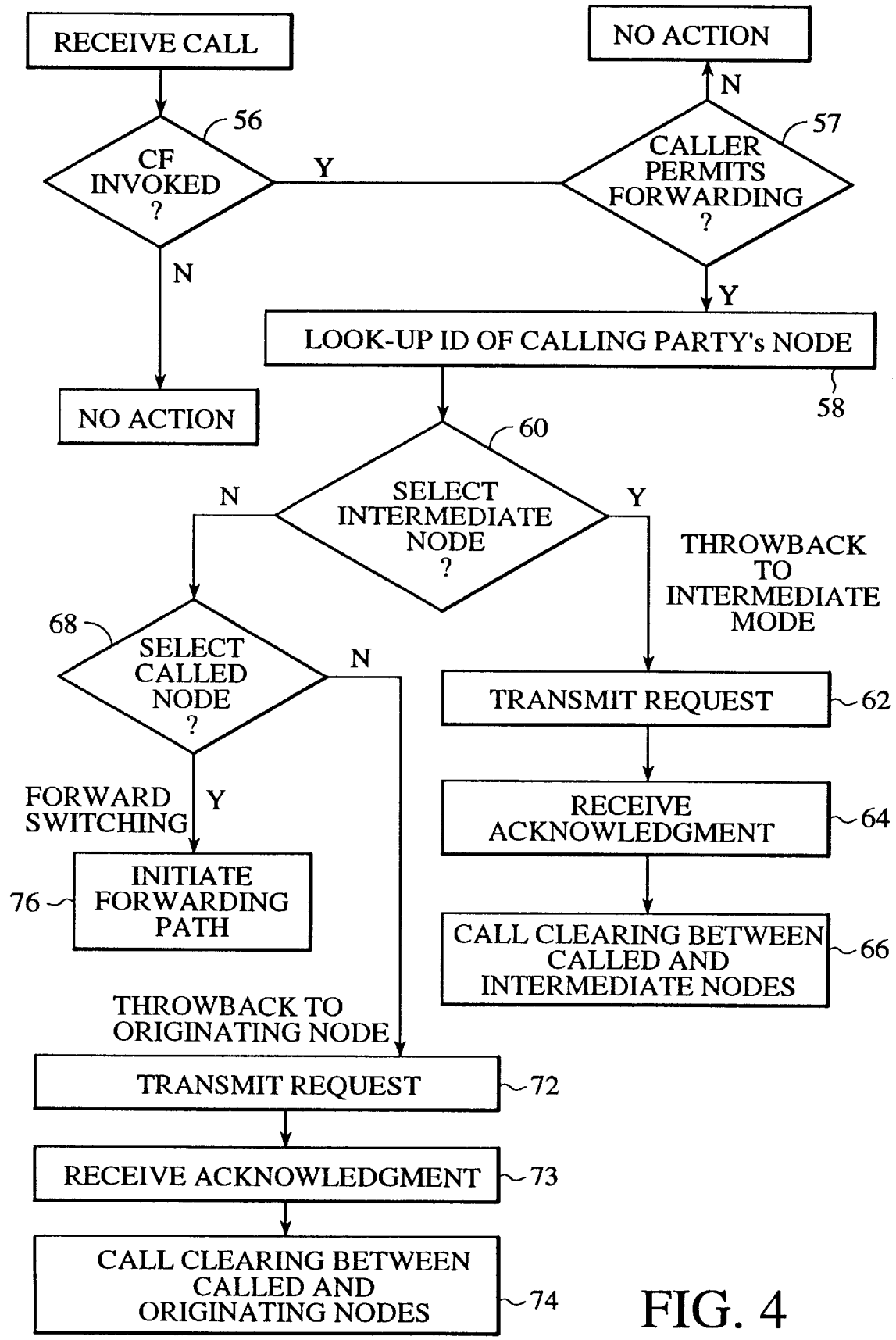
FIG. 4 is a flow chart of steps to be followed in managing a particular call to be forwarded in accordance with the invention.

FIG. 4 illustrates a sequence to be followed in the management of a particular call that is to be forwarded. In step 56, a determination is made as to whether call forwarding has been invoked, with the forwarding being to an address that is remote from the served user, i.e. the called node. A determination 57 is also made as to whether call forwarding is authorized by the caller. If either determination results in a "no," no action is taken by the call forwarding service. If "yes," the calling party's node ID is determined at step 58. The management system may implement this step by performing a look-up of the calling party's node ID from a control table 44, such as the one shown in FIG. 3. The node ID can be derived from the private calling party's number or obtained from the call setup message from the originating node.

In step 60, a determination is made as to whether to select a tandem/gateway node for initiating a forwarding path to the destination node. Again, the control table 44 plays a role. If the control table specifies a gateway node that is to be used for forwarding calls from the node that is identified in step 58, a request message will be transmitted from the called node to the specified gateway node, shown at step 62. The request message carries the identification of the gateway node from which call rerouting is to be activated. Alternatively, a non-gateway intermediate node along the call path may be specified.

That is, the specified intermediate node need not be a gateway node.

When an administrator specifies an intermediate node ID for call rerouting, as set forth in the CFMR control table 44, the specified node should be administered for CFMR_R_ active for a specified trunk group. If this is not done, the forwarding request message will be transparent to the specified node.

In step 64, the specified intermediate node initiates the forwarding path in response to the request message from the called node. If the intermediate node has been set CFMR_R_active, it will have saved at least some of the setup information that was transmitted from the originating node to the called node. Consequently, the intermediate node will be aware of the node ID of the originating node.

The forwarding request contains the redirecting and redirection name and number which are sent in the SETUP message to the destination node. The selected intermediate node sequentially performs at least four functions. Firstly, acknowledgement is sent to the called node in response to the forwarding request. Secondly, the SETUP message to the destination node is prepared to include the saved SETUP information and the redirecting and redirection name and number from the forwarding request. (Note: the redirecting number ID may include the reason for the call forwarding, if the called node ID provides this information.) Thirdly, the SETUP message is sent to the destination node. Fourthly, a NOTIFY message is sent to the called node with indication of call forwarding and the redirecting and redirection name and number. The steps that follow the sending of the NOTIFY message will differ depending upon specific factors, e.g., depending upon the call forwarding reason, if one is indicated in the forwarding request. Possible steps will be described below when referring to FIGS. 6A and 6B and subsequent figures.

Still referring to FIG. 4, since the called node is not in the link between the calling party and the forwarded-to party, the called node is released by disconnecting the link between the specified intermediate node and the called node. This is shown in FIG. 4 as a step 66 of call clearing between the called node and the intermediate node.

If at step 60 no intermediate node has been designated for initiating the forwarding path, a determination 68 is made regarding whether to use the originating node or the called node to initiate the forwarding path. Step 68 may be implemented using the administrable "case event" table 70 of FIG. 5. If the originating node, the called node and the destination node are all in the same logical boundary, then Case 1 applies. That is, rather than the called node initiating the forwarding path, the call is "thrown back" to the originating node and the called node exits from the procedure. This requires a forwarding request message at step 72 of FIG. 4. The request message is sent from the called node to the originating node. The called node can then be disconnected at step 74, minimizing the number of links involved in connecting the two parties.

In Case 2, if the called node and the destination node are in the same LB, but the originating node is in a different LB, the call is "forward switched." That is, the called node is selected at step 68 and the called node initiates a forwarding path at step 76. Since the connection between the calling party and the forwarded-to party includes both the calling path and the forwarding path, the called node remains connected.

In Case 3, the originating node and the called node are in the same LB, but the destination node is in a different LB. In this situation, the request message is transmitted to the originating node at step 72, the originating node initiates the forwarding path at step 73, and the called node is disconnected at step 74.

In Case 4, all of the nodes are all in different LBs. The call event table indicates that forward switching of the call at step 76 is to be provided. However, this is not critical.

Finally, in Case 5, the originating node and the destination node are in the same LB, but the called node is in a different LB. Steps 72, 73 and 74 are followed in order to throw back the call and exit the called node from the procedure.

Figure 6A:
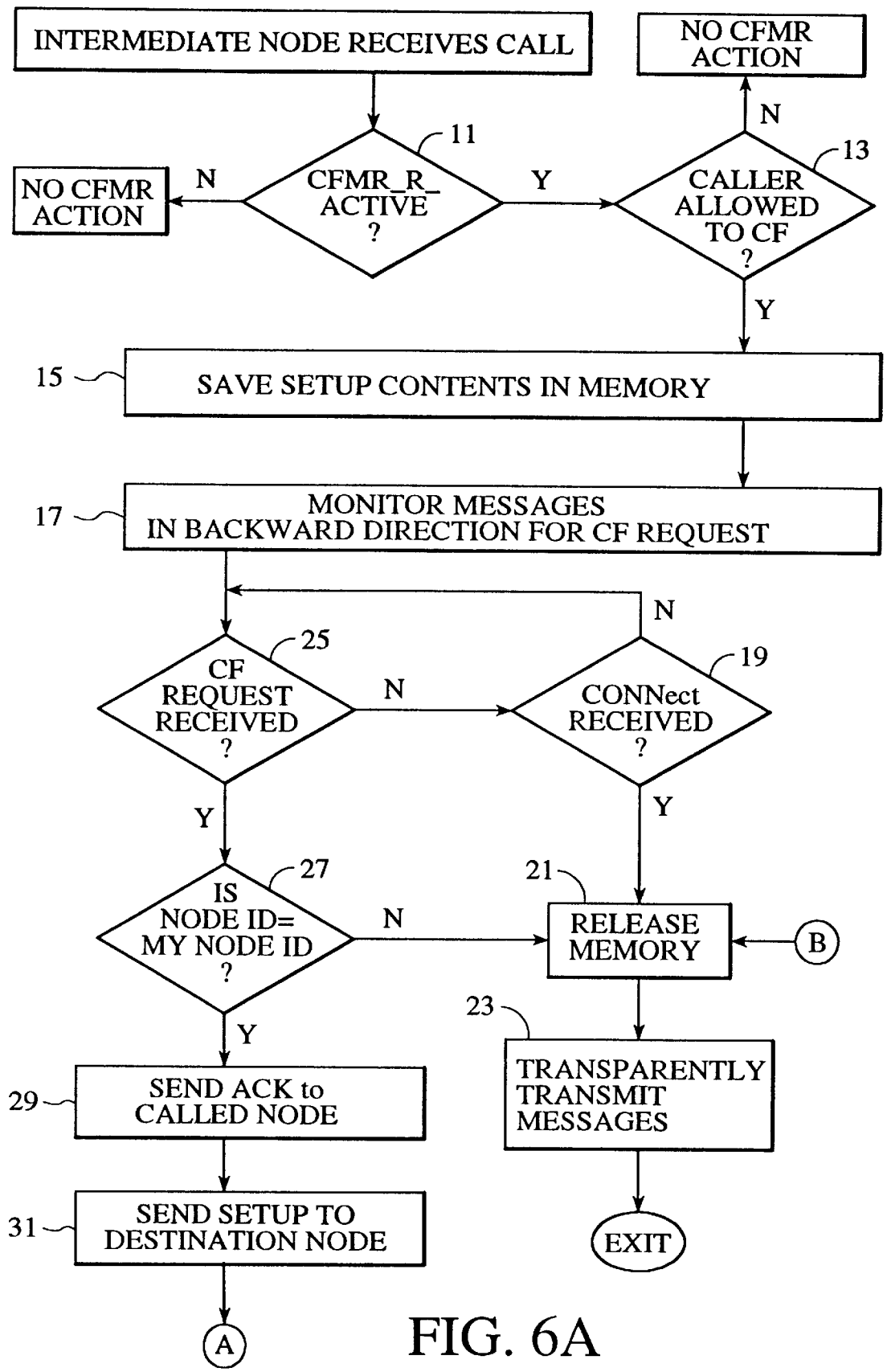
FIGS. 6A and 6B are a flow chart of steps to be followed in performing the forwarding at an intermediate node in accordance with the invention.
Figure 6B:
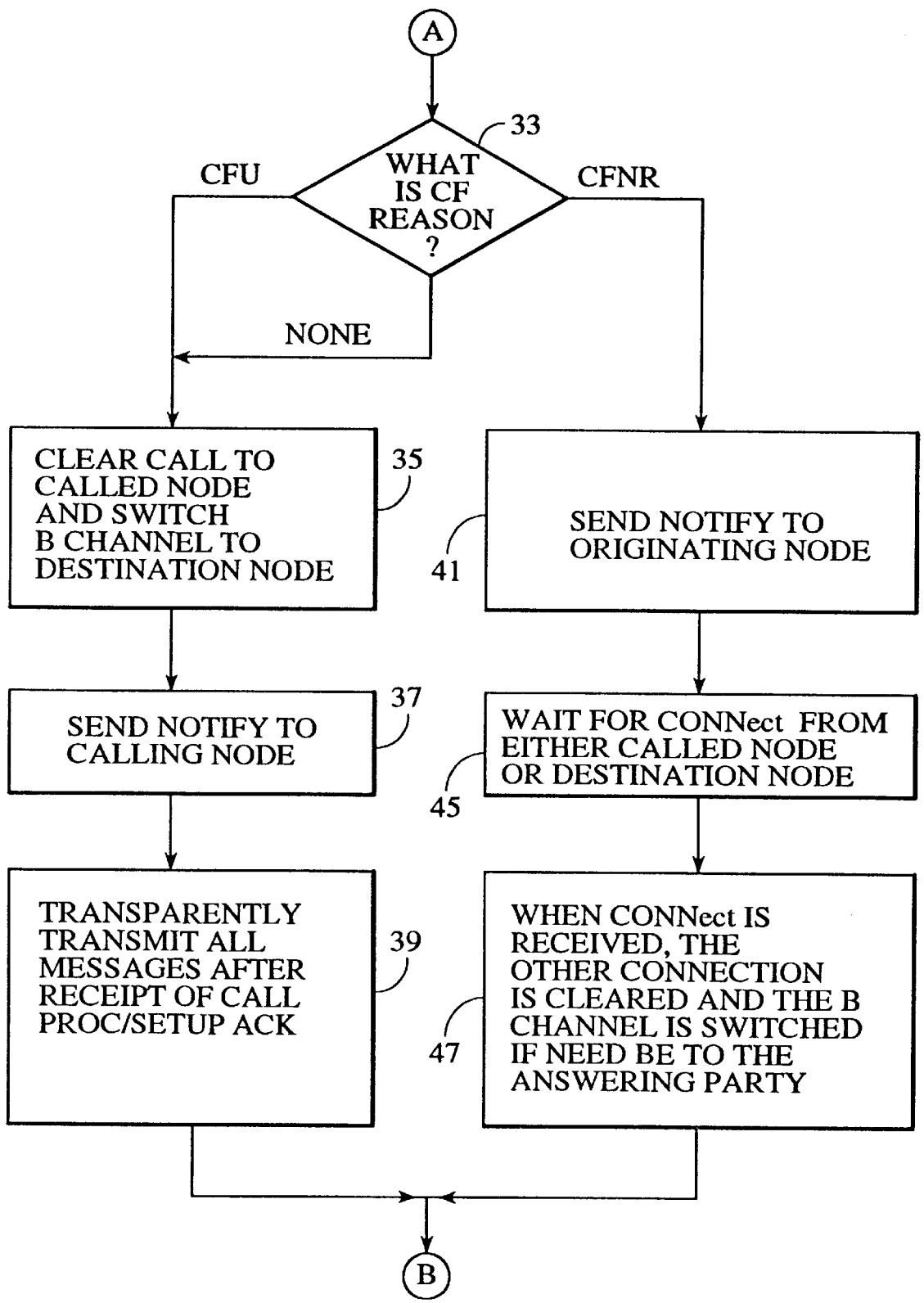

FIGS. 6A and 6B illustrate the sequence to be followed in an intermediate node which is set CFMR_R_active. In step 11, a determination is made as to whether to invoke rerouting at the intermediate node. If active, step 13 is necessary to ensure that the calling party allows this call to be forwarded, since if it cannot be forwarded there is no reason to save the SETUP message in memory or to monitor the D-channel for a call forwarding request.

When steps 11 and 13 are "yes," the entire contents of the SETUP message are saved for this call reference at step 15. Then, step 17 requires that the backward direction (from the called node) D-channel be monitored to detect a forwarding request for call forwarding. If at step 19 a CONNect message is received, no forwarding will occur for this call, so the memory may be released in step 21. Monitoring is then stopped and normal tandem operation of transparent transmitting of messages resumes with step 23.

On the other hand, if a forwarding request is detected at step 25, a determination is made in step 27 as to whether to act on the request. This determination at step 27 includes comparing the specified node ID of the node that is to perform the forwarding with the node ID of the intermediate node that is executing the steps of FIGS. 6A and 6B. If the two node IDs are not the same, the memory is released at step 21, monitoring is stopped and normal tandem operation of transmitting messages resumes at step 23. When the two node IDs are equal in value, an ACKnowledgement to the request is sent to the called node in step 29. In step 31 the saved setup information is sent to the destination node after being appended with the redirecting and redirection numbers and the call forwarding reason, if available. The appended information was previously received from the called node in the request message.

At step 33, a determination as to what type of forwarding occurred impacts what steps occur next. When the call forwarding reason is call forward unconditional (i.e., immediate, busy, all), or when the call forwarding reason is unknown, step 35 clears the connection to the called node and switches the B-channel connection from the originating node to the send and receive paths of the destination node. With step 37, a NOTIFY message is sent to the originating node to notify it that call forwarding has occurred and to identify the redirecting and redirection numbers. After a Call PROCeeding message (en-bloc) or SETUP ACK (overlap mode) from the destination node is received, step 39 reverts to tandem operations and may release the saved setup information from memory.

When in step 33 it is determined that the call forwarding reason is "delayed call forwarding" (e.g., CF no reply), a NOTIFY message is sent to the originating node to notify it that call forwarding has occurred and to identify the redirecting and redirection numbers. This is executed at step 41. The called node and the destination node are alerted simultaneously, but the caller at the originating node listens to ringback from the called node. In step 45, the first node to answer is awarded the call. Step 47 makes a determination of which is the answering node. When the answering node is the destination node, the send and receive paths of the called node are switched to the connection to the destination node and the connection to the called node is cleared. On the other hand, when the answering party is the called node, the connection to the destination node is cleared. Both actions from step 33 result in execution of step 21, wherein monitoring is stopped and normal tandem operation of transparent transmitting of messages resumes with step 23.

Figure 7:
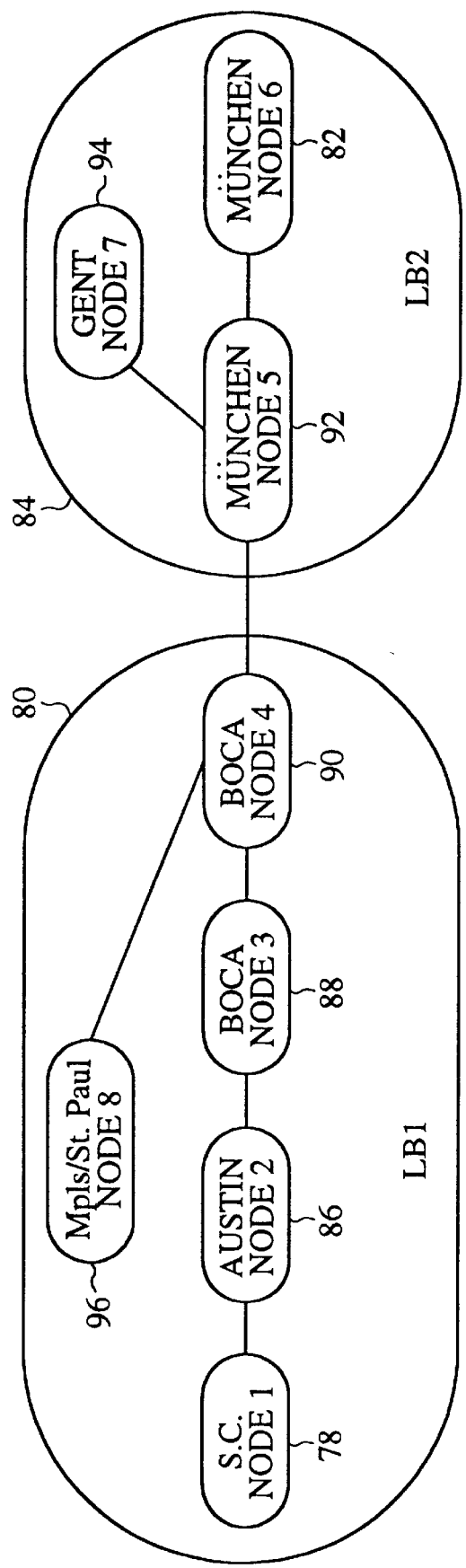
FIG. 7 is an exemplary topography that may be encountered in implementing the steps of FIG. 4.

Referring now to FIG. 7, greater detail will be described with respect to selecting an intermediate node, i.e. a tandem/gateway node, as the node for initiating a forwarding path. In order for an intermediate ode to perform rerouting, (1) CFMR_R_active must be assigned to the incoming and outgoing trunk groups, and (2) the original call setup information must be saved at the intermediate node, and (3) a forwarding request message that includes the node ID of the intermediate node must be received from the called node. The request also specifies the name and number of the redirecting and destination nodes. In the preferred embodiment, the forwarding request message will be transparent to the intermediate node in the absence of one of these three requirements. Only the node agreeing to perform the call forwarding rerouting responds with an ACK message. Since saving the original call setup information at the intermediate node requires significant switch resources in terms of time and memory, this function normally should not be in-service at every intermediate node and for every trunk group. The function should be carefully administered.

As an example, if a call originates at a Santa Clara node 78 within logical boundary 80 and is directed at a Munich node 82 within logical boundary 84, the call will tandem through nodes 86, 88, 90 and 92. In this example, it is best to save the original call setup information at Boca node 90 and at the first Munich node 92, since these two nodes are gateway nodes that provide the most efficient rerouting of calls. If the called party, who is a subscriber of the second Munich node 82, has identified an address at the Gent node 94 as the address for forwarding calls, call rerouting is optimized by initiating the forwarding path from the Munich gateway 92. The connection to the called address of the second Munich node 82 can then be released. On the other hand, if the destination address is identified as an address at a Minneapolis/St. Paul node 96, the Boca gateway node 90 is likely to be selected as the node for initiating the forwarding path. Again, the connection to the second Munich node 82 is released. Thus, for a call path from Santa Clara node 78 to the second Munich node 82, gateway nodes 90 and 92 should have CFMR_R_active assigned on the outgoing trunk group (i.e., from Boca to Munich and from Munich to Boca) and appropriate incoming trunk groups, as determined by the network administrator.

The CFMR_R_active/inactive indicator is assigned on a trunk group basis. It can be assigned to incoming and outgoing trunk groups. The process which checks to determine if a setup message should be saved must be aware of whether the relevant node is a tandem/gateway node for the particular call. Whether to save the setup message is determined by checking the assignment of the CFMR_R_active/inactive. However, this check of active/inactive status does not impact the protocol.

From the perspective of the calling party's node, the call forwarding notification has the appearance of an intra-nodal forward. The calling party is essentially unaware of the type of rerouting, although this information is available in a NOTIFY message. It is possible for a network administrator to configure a group of users, or many groups, with a specified least cost routing (LCR) authorization to use a particular outgoing trunk group at the originating node, with other users at that node being excluded from access. The network administrator can then administer an associated specific intermediate node incoming trunk group for CFMR_R_active in order to allow the users having access to be rerouted differently than the others.

Figure 8:
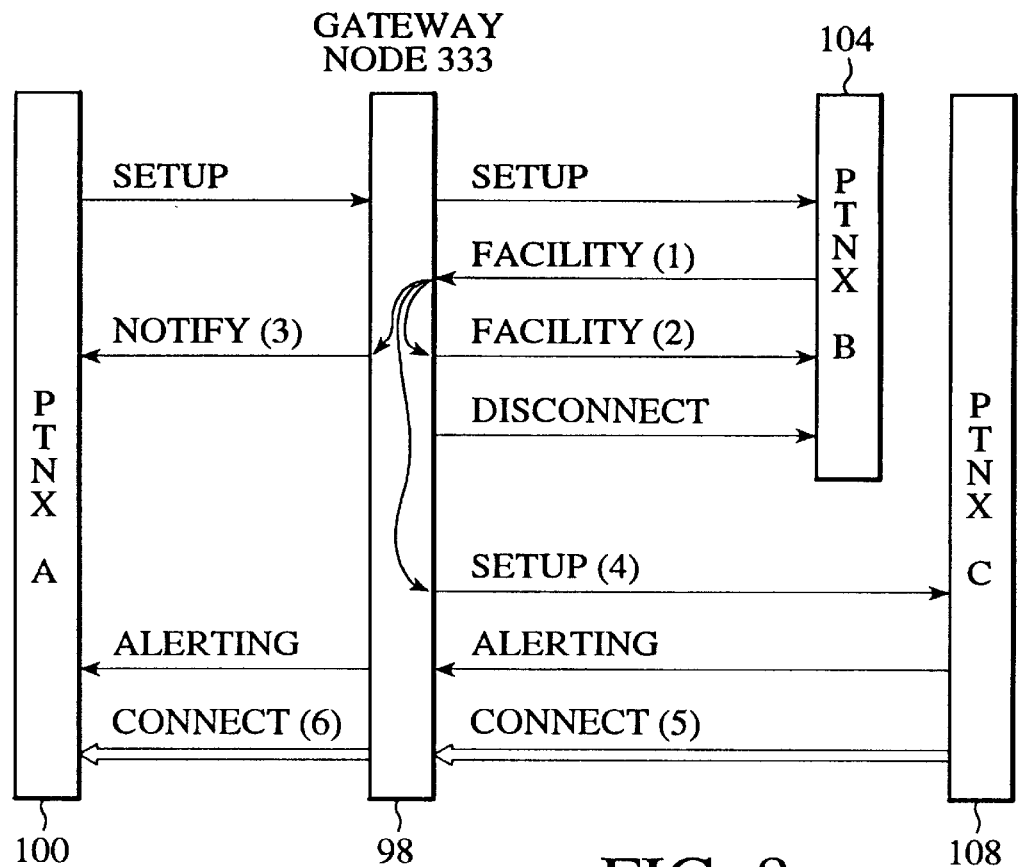
FIGS. 8 and 9 are illustrations of connections and messages in which a gateway node is selected to initiate call forwarding.
Figure 9:
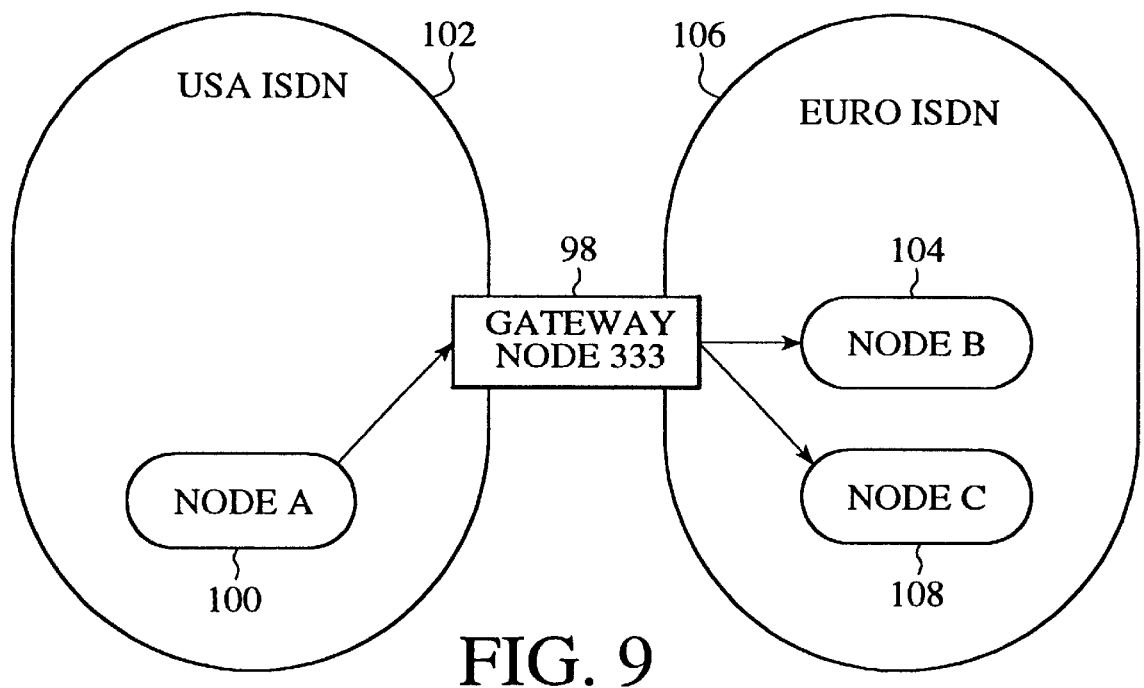

FIGS. 8 and 9 illustrate an example of message flow when call forwarding causes rerouting at a gateway node 98. The originating node is a PTN/X 100 within a first network 102. The called node 104 is in a second network 106. A setup message is transmitted from the originating node to the gateway node, which passes the setup message to the called node 104. At least some of the information of the setup message is saved at the gateway node. If call forwarding unconditional (CFU)/call forwarding busy (CFB) is invoked, the forwarding management may designate the gateway node 98 as the node for initiating the forwarding path to a destination node 108 that is within the second network 106.

The called node 104 transmits a first FACILITY message to the gateway node 98 to invoke call forwarding. This first FACILITY message is a request message. In response, the gateway node (1) sends a second FACILITY message to the called node in order to acknowledge reception of the first FACILITY message, and (2) transmits NOTIFY message to the originating node 100.

The gateway node 98 then executes call forwarding. A setup message is transmitted from the gateway node 98 to the destination node 108. As is well known in the art, ALERTING messages and CONNECT messages are transmitted from the destination node to the originating node via the gateway node. A DISCONNECT is transmitted from the gateway node to the called node 104 in order to disconnect the link to the called node.

Figure 10:
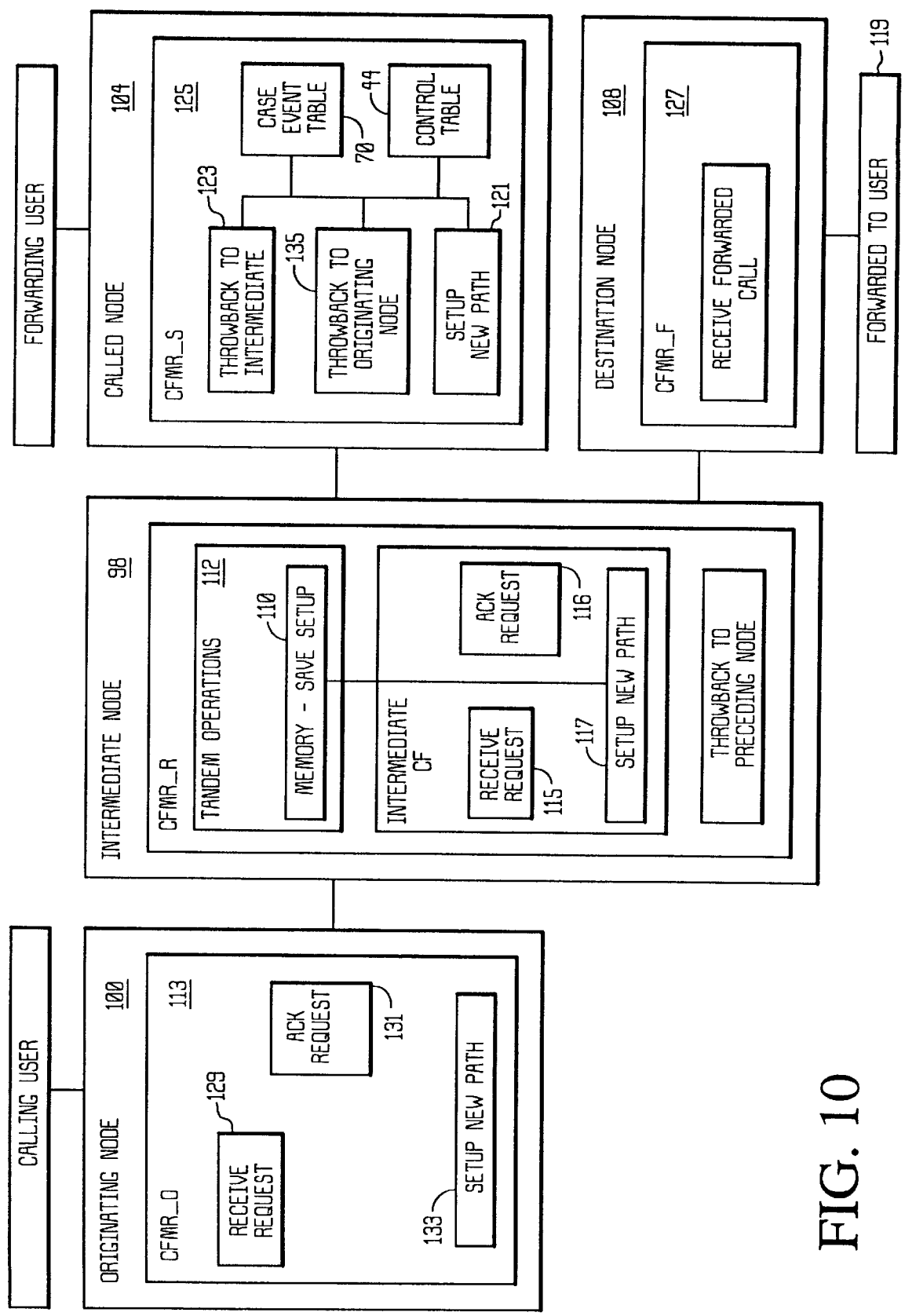
FIG. 10 is a block diagram of major components of call forwarding management rerouting in accordance with the invention.

Major functional components for providing the message forwarding of FIGS. 8 and 9 are shown in FIG. 10. The SETUP message from the originating node 100 is received in memory 110 at the gateway node 98. At least some of the setup information will be stored. A tandem operations component 112 will pass the setup message to the called node 104. FACILITY messages are exchanged between the called node 104 and the intermediate rerouting node 98, using the components of operations blocks 113 and 114.

In the intermediate node 98, a receive request component 115 receives the call forwarding request and triggers an ACKnowledgement component 116, if the intermediate node agrees to attempt call forwarding. A setup-new-path component 117 of the intermediate node then generates the SETUP message to a forwarded-to user 119, based upon the stored setup information at memory component 110 and from the redirecting and redirection information received from the FACILITY request from the called node 104. The FACILITY request is established and transmitted by the throwback-to-intermediate component 123 of the called node, using a control table 44 and a case event table 70 of the type previously described with reference to FIGS. 3 and 5.

Upon receiving the first backward end-to-end message (such messages typically include ALERT and/or CONNect messages, but could also be FACILITY, NOTIFY, Progress and DISConnect messages) from the destination node 108, the intermediate node 98 clears the connection to the called node 104 and transparently transmits messages that are sent and received from the originating node 100 and the destination node 108.

While not shown in FIG. 10, each of the four nodes 98, 100, 104 and 108 may have all four of the operation blocks 113, 114, 125 and 127 identified in the figure as CFMR_O, CFMR_R, CFMR_S and CFMR_F components. The CFMR_O operations block 113 of the originating node 100 includes a receive request component 129, an ACKnowledge request component 131, and a setup-new-path component 133. This operations block is the same as the CFMR_R operations block 114 in order to support throwback-to-the-originating-node signal exchanges with the appropriate component 135 of the called node 104. Likewise, the setup-new-path component 121 in the CFMR_S block is used for forward-switching the call at the called node, when the called node is designated by the control and case event tables 70 and 44 to be the node for initiating a forwarding path.

Figure 11:
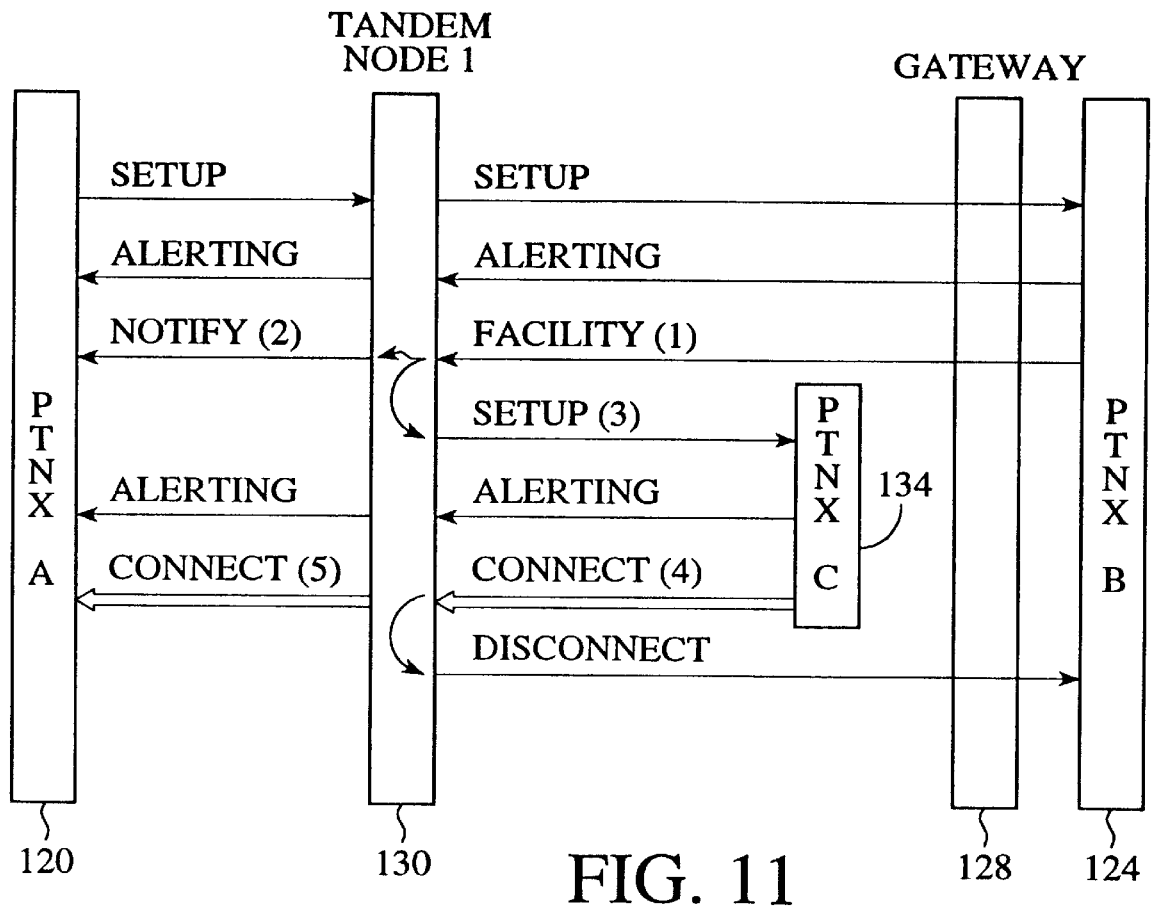
FIGS. 11 and 12 are illustrations of message flow in call forwarding by means of an intermediate node that is not a gateway node.
Figure 12:
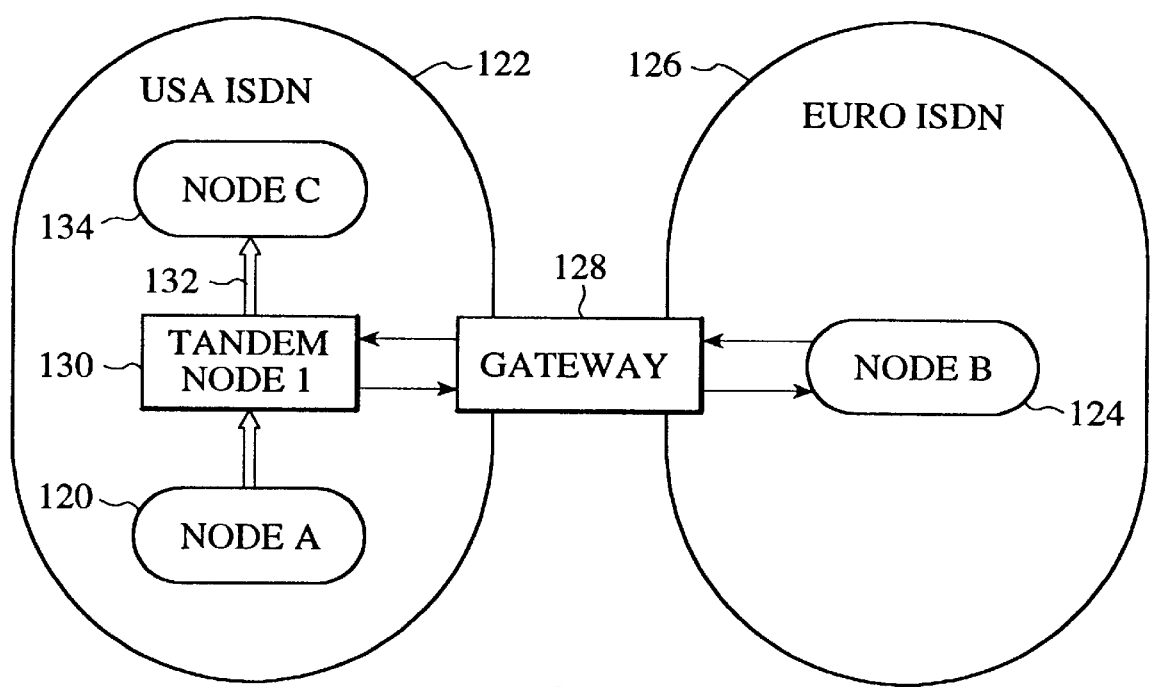

FIGS. 11 and 12 illustrate an example of message flow in which an intermediate node that is not a gateway node is selected for initiating the forwarding path. The originating node 120 is in a first network 122, while the called node 124 is in a second network 126. Communication between the two networks is established via a gateway node 128. As shown in FIG. 10, the setup message passes through the gateway node transparently, i.e. the gateway node does not store setup information. The gateway node is CFMR_R_inactive for the call.

In addition to the gateway node 128, a tandem node 130 is an intermediate node along the call path based upon the selection criteria, the tandem node 130 is selected for forming the forwarding path 132 to a destination node 134. Thus, the appropriate setup information has been stored at the tandem node 130, allowing the tandem node to establish a setup message for transmission to the destination node 134. The appropriate ALERT and CONNECT messages are exchanged between the destination node and the originating node 120. A DISCONNECT message can then be sent to the called node 124 to release the called node.

I claim:

1. A method of managing forwarding of a call to a destination node, wherein said call to be forwarded is received at a called node from an originating node via a call path, said method comprising steps of:

establishing criteria for selecting among possible links between nodes for forwarding calls directed to said called node;

based upon said criteria, determining whether an intermediate node along said call path from said originating node to said called node is to be selected for initiating a forwarding path to said destination node;

if said intermediate node is selected for initiating a forwarding path, transmitting a request to said intermediate node to initiate said forwarding path to said destination node;

if said intermediate node is unselected, using said criteria to select between initiating said forwarding path from said originating node and initiating said forwarding path from said called node; and (a) transmitting a request to said originating node to initiate said forwarding path if said originating node is selected; and (b) initiating said forwarding path from said called node if said called node is selected.

2. The method of claim 1 further comprising a step of determining at said called node whether said call is allowed to be call forwarded, including basing said determination upon setup information received from said originating node regarding permissibility of call forwarding service.

3. The method of claim 2 further comprising a step of monitoring a D-channel by said intermediate node when call forwarding rerouting has been activated at said intermediate node and said call has been determined to be permissible for call forwarding service.

4. The method of claim 1 further comprising a step of disconnecting a link from said intermediate node to said called node when said intermediate node initiates said forwarding path to said destination node.

5. The method of claim 1 further comprising a step of disconnecting a link from said originating node to said called node when said originating node initiates said forwarding path to said destination node.

6. The method of claim 1 wherein said step of establishing said criteria includes providing a geographical basis for selecting among said possible links for forwarding calls, said called node being one node in a first group of nodes, said first group being linked to other groups of nodes.

7. The method of claim 6 wherein said steps in which said forwarding path are selected using said criteria include determining whether said destination node is in the same group of nodes as one of said originating node and said called node.

8. The method of claim 6 wherein said step of establishing said criteria further includes providing a capability basis such that the ability of a node to initiate a forwarding path is ascertained prior to said selection of said forwarding path.

9. The method of claim 6 wherein said step of determining whether an intermediate node is to be selected for initiating a forwarding path includes determining whether there is a tandem/gateway node along said call path.

10. The method of claim 1 further comprising a step of receiving a setup message at said called node, with said setup message having an identification of said originating node.

11. A method of managing call forwarding of calls among nodes that are grouped according to factors that include geographical proximity and routing attributes, said nodes including gateway nodes for linking node groups having different routing attributes, said method comprising steps of:

transmitting call information along a call path from an originating node to a called node, including transmitting an identification of said originating node;

receiving said call information at said called node; and determining whether a call relating to said call information is allowed to be forwarded to a destination node and, if said call is to be forwarded, following substeps comprising:

(a) forming a forwarding path to said destination node from a gateway node along said call path if said gateway node has been designated as a node for forming said forwarding path;

(b) forming a forwarding path to said destination node from said originating node if said destination node and said originating node are in a single node group;

(c) forming a forwarding path to said destination node from said called node if said destination node and said called node are in a single node group; and (d) when substeps (a), (b) and (c) do not apply, using predetermined factors to select one of said originating node and said called node for forming a forwarding path to said destination node.

12. The method of claim 11 further comprising a step of saving at least some of said call information at said intermediate node during said step of transmitting said call information to said called node.

13. The method of claim 12 further comprising a step of enabling said gateway node to form said forwarding path, said step of transmitting said call information including transmitting setup information of an identification of a forwarded-to user of said destination node and an identification of a forwarding user of said called node.

14. The method of claim 11 further comprising a step of disconnecting said called node upon forming a forwarding path from one of said gateway node or said originating node.

15. A system for managing forwarding of a call to a destination node comprising:

storage means for storing criteria for selecting among possible links between remote nodes when a call from an originating node is to be forwarded from a called node to a destination node;

select means, responsive to said storage means, for selecting among said originating node, said called node and an intermediate node along a call path of a call to be forwarded, wherein said selecting designates a node from which a forwarding path to said destination node is to be initiated;

request and response means, operatively associated with said select means, for transmitting a request message to at least one of said originating and intermediate nodes to initiate said forwarding path, said request means being responsive to said select means when said select means designates one of said originating and intermediate nodes; and forwarding means, responsive to said select means, for initiating a forwarding path from said called node to said destination node when said select means designates said called node.

16. The system of claim 15 wherein said storage means, said select means, said request means and said forwarding means are interconnected at said called node.

17. The system of claim 16 further comprising means located at said called node for receiving a setup message identifying said originating node.

18. The system of claim 16 wherein said destination node is within a first group of related nodes that is connected to a plurality of other groups of related nodes.

19. The system of claim 18 wherein said select means is responsive to determination of which of said groups contain said originating, called and destination nodes.

20. The system of claim 18 wherein said groups are connected by integrated services digital network (ISDN) lines.

* * * * *